(12) United States Patent

Ferrari et al.

(10) Patent No.: US 12,598,418 B2

(45) Date of Patent: Apr. 7, 2026

(54) METHOD AND SYSTEM FOR TRANSMITTING AUDIO SIGNALS

(71) Applicant: SONOVA AG, Staefa (CH)

(72) Inventors: Federico Ferrari, Lugano (CH);
Mauro Candela, Cressier (CH);
Oleksiy Kasilov, Bern (CH); Georg Dickmann, Ebmatingen (CH); Amre El-Hoiydi, Neuchâtel (CH); Yves Oesch, Neuchatel (CH)

(73) Assignee: Sonova AG, Staefa (CH)

( * ) Notice: Subject to any disclaimer, the term of this patent is extended or adjusted under 35 U.S.C. 154(b) by 99 days.

(21) Appl. No.: 18/596,358

(22) Filed: Mar. 5, 2024

(65) Prior Publication Data

US 2024/0305927 A1 Sep. 12, 2024

(30) Foreign Application Priority Data

Mar. 6, 2023 (EP) .................................... 23160262

(51) Int. Cl.
| | |
|---|---|
| *H04R 1/10* | (2006.01) |
| *H04L 1/00* | (2006.01) |
| *H04R 3/00* | (2006.01) |
| *H04W 76/14* | (2018.01) |
| *H04R 5/02* | (2006.01) |

(52) U.S. Cl.
CPC ............. *H04R 3/00* (2013.01); *H04L 1/0061* (2013.01); *H04W 76/14* (2018.02); *H04R 2420/07* (2013.01)

(58) Field of Classification Search
CPC ..... H04R 2420/07; H04R 3/00; H04L 1/0061; H04W 76/14

USPC .................................................... 381/74, 311
See application file for complete search history.

(56) References Cited

U.S. PATENT DOCUMENTS

| | | | |
|---|---|---|---|
| 9,681,236 B2 | 6/2017 | El-Hoiydi et al. | |
| 9,826,321 B2 | 11/2017 | El-Hoiydi et al. | |
| 2025/0203598 A1* | 6/2025 | Goyal ............... | H04W 72/0446 |

OTHER PUBLICATIONS

Irvin D. R.: "Embedding a secondary communication channel transparently within a cyclic redundancy check (CRC)", IBM Journal of Research and Development, International Business Machines Corporation, New York NY, US, vol. 45. No. 6, Nov. 1, 2001 (Nov. 1, 2001), pp. 789-796, XP002325049, ISSN: 0018-8646.

(Continued)

*Primary Examiner* — Ammar T Hamid

(74) *Attorney, Agent, or Firm* — ALG Intellectual Property, LLC

(57) ABSTRACT

There is provided a method for transmitting audio signals, comprising: establishing a wireless link utilizing Bluetooth LE Audio between an audio signal transmission unit and an audio signal receiver unit; transmitting BIS data PDUs representative of an audio signal via the wireless link from the audio signal transmission unit to the audio signal receiver unit; and providing, by the audio signal transmission unit, a BIG control PDU with time-critical control data to be transmitted to the audio signal receiver unit as part of its payload, wherein a marked CRC value is provided in the standard CRC field of said BIG control PDU which is different from the standard CRC value of said BIG control PDU.

15 Claims, 4 Drawing Sheets

(56) References Cited

OTHER PUBLICATIONS

Woolley, Martin: "The Bluetooth Low Energy Primer", Jun. 6, 2022 (Jun. 6, 2022), pp. 1-87, XP093070516. Retrieved from the Internet: URL: https://www.bluetooth.com/wp-content/uploads/2022/05/Bluetooth_LE_Primer_Paper.pdf. (retrieved on Aug. 4, 2023).
European Search Report and Written Opinion received Aug. 11, 2023 in European Application EP2316262.4.

\* cited by examiner

METHOD AND SYSTEM FOR TRANSMITTING AUDIO SIGNALS

RELATED APPLICATIONS

The present application claims priority to EP Patent Application No. 23160262.4, filed Mar. 6, 2023, the contents of which are hereby incorporated by reference in their entirety.

BACKGROUND INFORMATION

When broadcasting a Bluetooth Low Energy Audio (LE Audio) stream, it may be desirable to convey as quickly as possible, from the audio signal transmission unit to the audio signal receiver units, time-critical control data to be used by the receiver units, in particular, for processing of the received audio signals. For example, a hearing device may activate noise cancellation when the audio signal transmission unit indicates that speech is absent in the broadcasted stream and deactivates it when it is notified that speech is present again. Latency of voice activity detection (VAD) control data is crucial and must be in the order of few milliseconds, otherwise a hearing device user may miss the initial syllables of a speech if the hearing device receives this control data too late.

U.S. Pat. No. 9,826,321 B2 and U.S. Pat. No. 9,681,236 B2 relate to wireless audio signal transmission systems using a proprietary wireless protocol, wherein during a TDMA frame the transmission unit, which is a wireless microphone arrangement, replaces one or more audio packet transmissions with control data packets that include a marker (e.g., a known "magic number") which the receiver units, which may be hearing devices, can use to detect that such packet does not contain audio data as expected but control data to be used by the receiver unit. Packet Loss Concealment (PLC) on the hearing devices takes care of masking the missing audio packets in a way that is not very noticeable to the end user.

BRIEF DESCRIPTION OF THE DRAWINGS

Hereinafter, examples of the invention will be illustrated by reference to the attached drawings, wherein.

DETAILED DESCRIPTION

Figure 1:
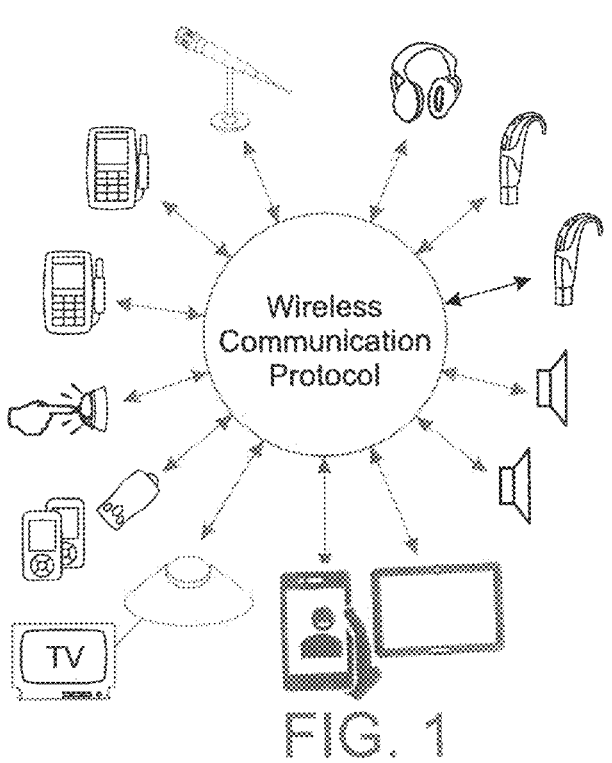
FIG. 1 is a schematic view of examples of audio components which may be used with the principles described herein.

Described herein are a method and a system for transmitting audio signals from an audio signal transmission unit, such as a wireless microphone arrangement, to an audio signal receiver unit, such as a hearing device, via a wireless link utilizing Bluetooth LE Audio.

It is a feature described herein to provide for a method and a system for transmitting audio signals from an audio signal transmission unit, such as a wireless microphone arrangement, to an audio signal receiver unit, such as a hearing device, via a wireless link utilizing Bluetooth LE Audio which allows for low latency transmission of time-critical control data while preventing audio artefacts in the audio signal receiver unit.

The features described herein are beneficial in that, by applying a modification to the Bluetooth Cyclic Redundancy Check (CRC) field which is known both to the transmission unit and the receiver unit, the CRC field of a Broadcast Isochronous Group BIG Control Protocol Data Unit (PDU) can be used as a marker for indicating to the receiver unit that the BIG Control PDU contains time-critical control data for data processing in the receiver unit rather than control data for the Bluetooth controller, so that time-critical control data can be transmitted in a BIG event without compromising audio signal transmission in the Broadcast Isochronous Stream (BIS) Data PDUs. Thereby, delay resulting from transmission of time-critical control data with standardized ways, e.g., in advertising packets can be avoided, while nevertheless preventing audio artefacts. In particular, even operation of transmission unit with a receiver unit not being aware of the modified CRC field of the BIG Control PDU would be possible, since such receiver would simply ignore the modified BIG Control PDU as considering it corrupted due to its incorrect CRC value.

It is noted that the features described herein may be suitable for seldom exchanges of relatively small amounts of control data.

A first aspect relates to a method for transmitting audio signals, comprising:

establishing a wireless link utilizing Bluetooth LE Audio between an audio signal transmission unit and an audio signal receiver unit;

transmitting BIS data PDUs representative of an audio signal via the wireless link from the audio signal transmission unit to the audio signal receiver unit;

providing, by the audio signal transmission unit, a BIG control PDU with time-critical control data to be transmitted to the audio signal receiver unit as part of its payload, wherein a marked CRC value is provided in the standard CRC field of said BIG control PDU which is different from the standard CRC value of said BIG control PDU;

transmitting, by the audio signal transmission unit, the BIG control PDU via the wireless link to the audio signal receiver unit, and receiving, by the receiver unit, the BIG control PDU;

calculating, by the audio signal receiver unit, the standard CRC value of the received BIG control PDU and comparing the calculated standard CRC value with the value of the standard CRC field of the received BIG control PDU; and analyzing, by the audio signal receiver unit, the received BIG Control PDU as to whether or not the payload comprises time-critical control data, when the value of the standard CRC field of the received BIG control PDU does not match the calculated standard CRC value of the received BIG control PDU.

According to one example, the marked CRC value may be provided by a first algorithm which calculates the standard CRC value and advertently corrupts the calculated standard CRC value. For example, the standard CRC value may be advertently corrupted by adding a constant value to the standard CRC value or by inverting at least one bit of the payload when calculating the standard CRC value.

According to one example, the payload of the BIG control PDU may include a time-critical control data (TCCD) field for the time-critical control data and a software CRC (SCRC) field containing a SCRC value calculated by a second algorithm based on the time-critical control data in the TCCD field, wherein the audio signal receiver unit, when the CRC value of the standard CRC field of the BIG control PDU was found to not match with the standard CRC value, calculates, using the second algorithm, the SCRC value of the data in the TCCD field of the BIG control PDU received from the audio signal transmission unit and compares the calculated SCRC value with the value of the SCRC field of the received BIG control PDU so as to verify the data in the TCCD field as valid control data for the audio signal receiver unit. For example, the audio signal receiver unit may ignore the data in the TCCD field when the calculated SCRC value is found to not match with the value in the SCRC field.

According to one example, the calculation of the SCRC value may be based on an CRC initialization vector which is known both to the audio signal transmission unit and the audio signal receiver unit. In particular, the calculation of the SCRC value may include the data in the TCCD field and optionally the header.

According to one example, the marked CRC value may be calculated as a customized CRC value by a first algorithm from the payload of the BIG Control PDU, wherein the audio signal receiver unit, when the value of the standard CRC field of the received BIG control PDU was found to not match the standard CRC value, calculates, using the first algorithm, the customized CRC value of the received BIG control PDU, and wherein the time-critical control data in the received BIG control PDU is verified as valid control data for the audio signal receiver unit when the customized CRC value is found to match with the value in the standard CRC field of the received BIG control PDU.

A second aspect relates to a method for transmitting audio signals, comprising:

establishing a wireless link utilizing Bluetooth LE Audio between an audio signal transmission unit and an audio signal receiver unit; and transmitting BIS data PDUs representative of an audio signal via the wireless link from the audio signal transmission unit to the audio signal receiver unit;

providing, by the audio signal transmission unit, a BIG control PDU with time-critical control data to be transmitted to the audio signal receiver unit as part of its payload, wherein a marked CRC value is provided in the standard CRC field of said BIG control PDU which is different from the standard CRC value of said BIG control PDU and wherein the marked CRC value is calculated as a customized CRC value by a first algorithm from the payload of the BIG Control PDU;

transmitting, by the audio signal transmission unit, the BIG control PDU via the wireless link to the audio signal receiver unit, and receiving, by the receiver unit, the BIG control PDU;

analyzing, by the audio signal receiver unit, the received BIG Control PDU as to whether or not the payload comprises time-critical control data, wherein the audio signal receiver unit calculates, using the first algorithm, the customized CRC value of the received BIG control PDU, and wherein the time-critical control data in the received BIG control PDU is verified as valid control data for the audio signal receiver unit when the customized CRC value is found to match with the value in the standard CRC field of the received BIG control PDU; and, when the customized CRC value is found to not match with the value in the standard CRC field of the received BIG control PDU, calculating, by the audio signal receiver unit, the standard CRC value of the received BIG control PDU and comparing the calculated standard CRC value with the value of the standard CRC field of the received BIG control PDU, wherein the audio signal receiver unit considers the BIG control PDU to contain Bluetooth LE Audio control data when the calculated standard CRC value matches with the value of the standard CRC field of the received BIG control PDU.

The following examples apply to both the first and the second aspect.

According to one example, a Bluetooth LE Audio controller of the audio signal receiver unit may ignore the BIG control PDU as not containing Bluetooth LE Audio control data when the Bluetooth LE Audio controller finds a mismatch of the value of the standard CRC field of the received BIG control PDU with the standard CRC value.

According to one example, the transmitting of time-critical control data by the audio signal transmission unit as part of the BIG control PDU may follow the transmission of the BIS data PDUs in a current BIG event.

According to one example, the audio signal transmission unit, when having identified time critical control data, may set the Control Subevent Transmission Flag (CSTF) in the header of the BIS data PDUs transmitted in the current BIG event to "1" and increase the Control Subevent Sequence Number (CSSN) to indicate to the audio signal receiver unit that a BIG control PDU will be transmitted after transmission of the BIS data PDUs of the current BIG event.

According to one example, transmission of the time-critical control data by the audio signal transmission unit as part of the BIG control PDU may be repeated in the next BIG event subsequent to the present BIG event.

According to one example, the time-critical control data may be used by the audio signal receiving unit for controlling the processing of the audio signal received from the audio signal transmission unit.

For example, the time-critical control data may include information as to whether or not speech is absent in the audio signal to be transmitted. In particular, the audio signal transmission unit may perform voice activity detection (VAD) in the audio signal to be transmitted.

According to one example, the audio signal receiver unit may activate a noise cancellation feature when the data in the TCCD field indicates that speech is absent in the audio signal received from the audio signal transmission unit and deactivate the noise cancellation feature when the data in the TCCD field indicates that speech is present in the audio signal received from the audio signal transmission unit.

According to one example, the time-critical control data may include information regarding a surrounding noise level in the audio signal to be transmitted; in particular, the audio signal transmission unit may detect the surrounding noise level in the audio signal to be transmitted. For example, the audio signal receiver unit may adapt the output level of the audio signal received from the audio signal transmission unit depending on the surrounding noise level indicated in the time-critical control data in the TCCD field.

According to one example, the time-critical control data may include information regarding current movement of the audio signal transmission unit in space.

According to one example, the audio signal transmission unit may be designed as a wireless microphone arrangement to be worn or held by a speaker for capturing the speaker's voice as the audio signal to be transmitted.

According to one example, the audio signal receiver unit may be a hearing device for stimulating the hearing of a user according to the audio signal received from the audio signal transmission unit; in particular, the audio signal receiver unit may form part of a binaural hearing system.

According to one example, the audio signal transmission unit may broadcast the audio signal via the wireless link to a plurality of audio signal receiver units, including said audio signal receiver unit.

According to one example, the plurality of audio signal receiving units may include at least one audio signal receiver unit which is programmed to generally ignore the BIG control PDU when its Bluetooth LE Audio controller finds a mismatch of the CRC value in the standard CRC field of the BIG control PDU with the standard CRC value.

According to one example, the audio signal transmission unit may transmit time-critical control data not only as part of the payload of the BIG control PDU but in addition also as part of periodic advertising packets which the audio signal transmission unit periodically transmits via the wireless link.

A "hearing device" as used hereinafter is any ear level element suitable for reproducing sound by stimulating a user's hearing, such as an electroacoustic hearing aid, a bone conduction hearing aid, an active hearing protection device, a hearing prostheses element such as a cochlear implant, a wireless headset, an earbud, an earplug, an earphone, etc.

"Time-critical control data" as used hereinafter relates to control data to be sent from the transmission unit to the receiver unit for being used in the processing in the receiver unit but being different from Bluetooth LE Audio control data to be used by the Bluetooth LE Audio controller of the receiver unit.

"Standard CRC value" as used hereinafter means that the value in/for the CRC field of the BIG Control PDU is calculated according to the Bluetooth core specification.

"Marked CRC value" as used hereinafter means that the value in/for the CRC field of the BIG Control PDU is different from the one calculated according to the Bluetooth core specification; however, it is not required that the "marked CRC value" can be used for verifying the payload of the BIG Control PDU.

"Customized CRC value" as used hereinafter is a specific example of a "marked CRC value", wherein the value in/for the CRC field of the BIG Control PDU is different from the one calculated according to the Bluetooth core specification in way that it still can be used for verifying the payload of the BIG Control PDU.

FIG. 1 is a schematic illustration of examples of audio signal transmission units and audio signal receiver units connected via a wireless link utilizing Bluetooth LE Audio. As shown in FIG. 1, the unit used on the audio signal transmission side may be, for example, a wireless microphone used by a speaker in a room for an audience; an audio transmitter having an integrated or a cable-connected microphone which are used by teachers in a classroom for hearing-impaired pupils/students; an acoustic alarm system, like a door bell, a fire alarm or a baby monitor; an audio or video player; a television device; a smartphone; a tablet; a broadcaster installed in public venues such as cinemas, airports; etc. The transmission units include body-worn devices as well as fixed devices. The units on the audio signal receiver side include headphones, all kinds of hearing aids, ear pieces, such as for prompting devices in studio applications or for covert communication systems, earbuds, and loudspeaker systems. The receiver units may be for hearing-impaired persons or for normal-hearing persons. Also on the receiver side a gateway could be used which relays audio signal received via a digital link to another device comprising the stimulation means.

The system may include a plurality of units on the transmission side and a plurality of units on the receiver side, for implementing a network architecture, usually in a master-slave topology.

The transmission unit may comprise or may be connected to a microphone for capturing audio signals, which is typically worn by a user, with the voice of the user being transmitted via the wireless audio link to the receiver unit.

The receiver unit may form part of a hearing device or may be connected to a hearing device.

Bluetooth LE Audio is a wireless protocol which is particularly suitable for transmission of audio signals from a single transmission device to a plurality of receiver devices.

In addition to the audio signals, control data may be transmitted bi-directionally between the transmission unit and the receiver unit. Such control data may include, for example, volume control or a query regarding the status of the receiver unit or the device connected to the receiver unit (for example, battery state and parameter settings). In particular, the audio signal transmission unit may transmit time-critical control data which includes information as to whether or not speech is present in the transmitted audio signal, information regarding a surrounding noise level in the transmitted audio signal, or information regarding current movement of the audio signal transmission unit in space. Such information may be used in the processing of the audio signals received by the receiver units.

Figure 2:
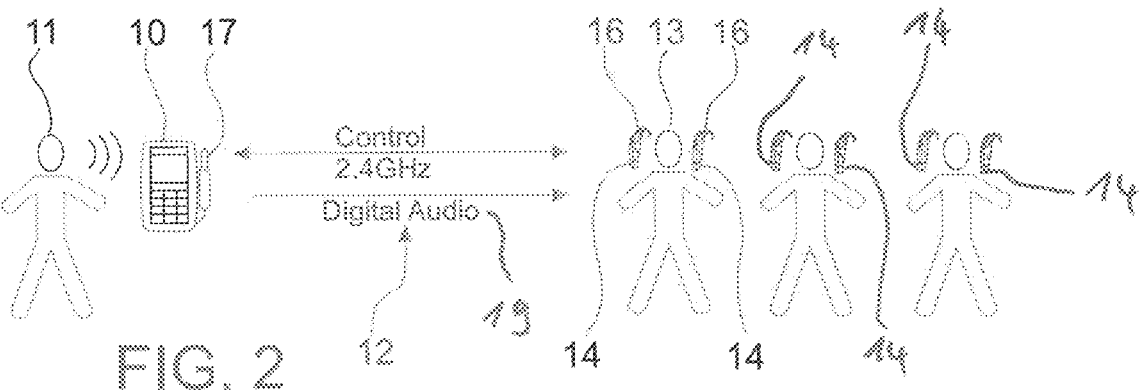
FIGS. 2 to 4 are schematic views of examples of audio streaming situations.

FIG. 2 illustrates schematically a typical use case, wherein a body-worn transmission unit 10 comprising a microphone 17 is used by a teacher 11 in a classroom for transmitting audio signals corresponding to the teacher's voice via a Bluetooth LE Audio link 12 to a plurality of receiver units 14, which are integrated within or connected to hearing aids 16 worn by hearing-impaired pupils/students 13. The wireless link 12 is also used to exchange control data between the transmission unit 10 and the receiver units 14. Typically, the transmission unit 10 is used in a broadcast mode, i.e. the same signals are sent to all receiver units 14.

Figure 3:
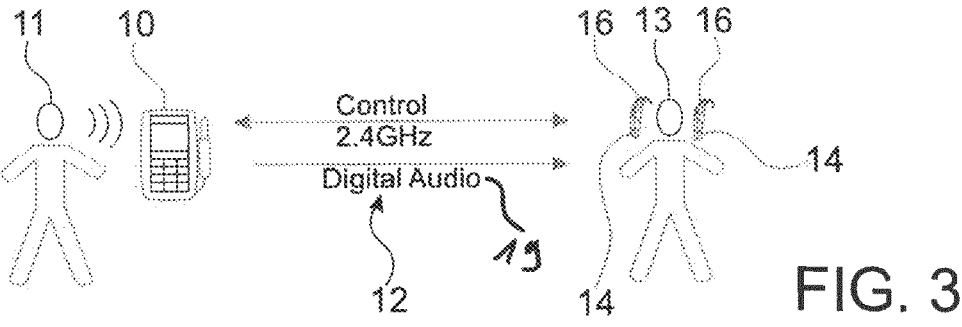

Another typical use case is shown in FIG. 3, wherein a transmission 10 having an integrated microphone is used by a hearing-impaired person 13 wearing receiver units 14 connected to or integrated within a hearing aid 16 for capturing the voice of a person 11 speaking to the person 13. The captured audio signals are transmitted via the wireless link 12 to the receiver units 14.

Figure 4:
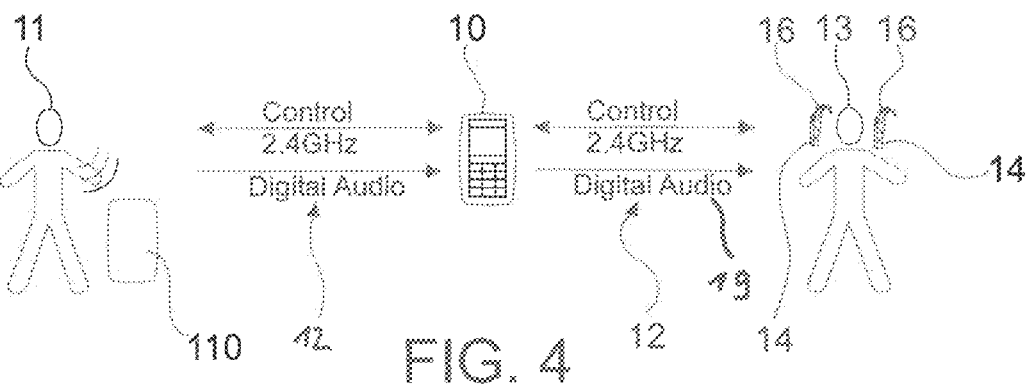

A modification of the use case of FIG. 3 is shown in FIG. 4, wherein the transmission unit 10 is used as a relay for relaying audio signals received from a remote transmission unit 110 to the receiver units 14 of the hearing-impaired person 13. The remote transmission unit 110 is worn by a speaker 11 and comprises a microphone for capturing the voice of the speaker 11, thereby acting as a companion microphone.

According to a variant of the embodiments shown in FIGS. 2 to 4 the receiver units 14 could be designed as a neck-worn device comprising a transmitter for transmitting the received audio signals via an inductive link to an ear-worn device, such as a hearing aid.

The transmission units 10, 110 may comprise an audio input for a connection to an audio device, such as a mobile phone, a FM radio, a music player, a telephone or a TV device, as an external audio signal source.

In each of such use cases the transmission unit 10 usually comprises an audio signal processing unit (not shown in FIGS. 2 to 4) for processing the audio signals captured by the microphone prior to being transmitted.

Figure 5:
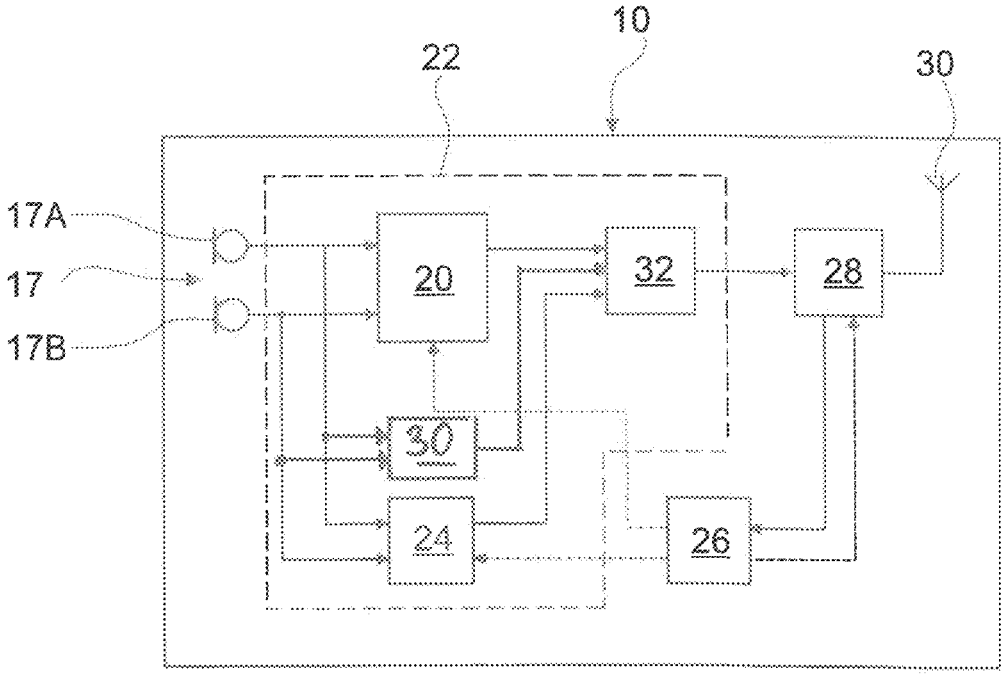
FIG. 5 is a block diagram of an example of a transmission unit which may be used with the principles described herein.

An example of a transmission unit 10 is shown in FIG. 5, which comprises a microphone arrangement 17 for capturing audio signals from the respective speaker's 11 voice, an audio signal processing unit 20 for processing the captured audio signals, a digital transmitter 28 and an antenna 30 for transmitting the processed audio signals as an audio stream 19 consisting of audio data packets. The audio signal processing unit 20 serves to compress the audio data using an appropriate audio codec, as it is known in the art. The compressed audio stream 19 forms part of a Bluetooth LE Audio link 12 established between the transmission units 10 and the receiver unit 14, which link also serves to exchange control data packets between the transmission unit 10 and the receiver unit 14.

The transmission unit 10 may include additional components, such as a voice activity detector (VAD) 24. The audio signal processing unit 20 and such additional components may be implemented by a digital signal processor (DSP) indicated at 22. In addition, the transmission units 10 also may comprise a microcontroller 26 acting on the DSP 22 and the transmitter 28. The microcontroller 26 may be omitted in case that the DSP 22 is able to take over the function of the microcontroller 26. In some examples, the microphone arrangement 17 comprises at least two spaced-apart microphones 17A, 17B, the audio signals of which may be used in the audio signal processing unit 20 for acoustic beamforming in order to provide the microphone arrangement 17 with a directional characteristic.

The VAD 24 uses the audio signals from the microphone arrangement 17 as an input in order to determine the times when the person 11 using the respective transmission unit 10 is speaking. The VAD 24 may provide a corresponding control output signal to the microcontroller 26 in order to notify the receiver units 14 to reduce the gain applied to the received audio signals during times when no voice is detected and to increase the gain again during times when voice activity is detected.

In addition, control data corresponding to the output signal of the VAD 24 may be generated and transmitted via the wireless link 12 for being used by the receiver units 14, such as for corresponding control of the audio signal processing in the receiver units 14. To this end, a unit 32 is provided which serves to generate a digital signal comprising the audio signals from the processing unit 20 and the control data generated by the VAD 24, which digital signal is supplied to the transmitter 28.

In addition to the VAD 24, the transmission unit 10 may comprise an ambient noise estimation unit 30 which serves to estimate the ambient noise level and which generates a corresponding output signal which may be supplied to the unit 32 for being transmitted via the wireless link 12 as control data. Such ambient noise level information may be used for control of the audio signal processing in the receiver units 14.

The transmission unit 10 also may comprises a motion sensor which provides an output signal representative of the current movement of the transmission unit 10 in space which may be supplied to the unit 32 for being transmitted via the wireless link 12 as control data for the receiver unit 14.

According to one embodiment, the transmission unit 10 may be adapted to be worn by the respective speaker 11 below the speaker's neck, for example as a lapel microphone or as a shirt collar microphone.

Figure 6:
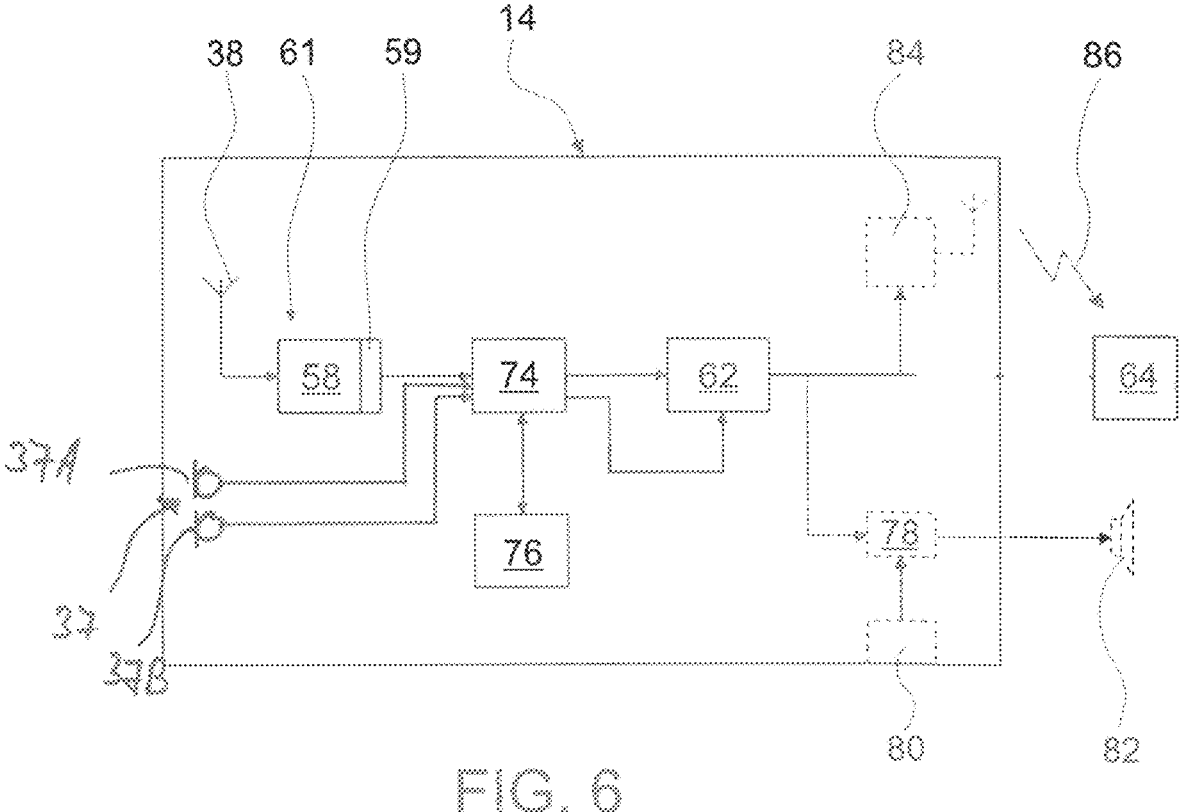
FIG. 6 is a block diagram of an example of a receiver unit which may be used with the principles described herein.

An example of an audio signal receiver unit 14 is shown in FIG. 6, according to which the antenna arrangement 38 is connected to a digital transceiver 61 including a demodulator 58 and a buffer 59. The signals transmitted via the digital link 12 are received by the antenna 38 and are demodulated in the digital radio receivers 61. The demodulated signals are supplied via the buffer 59 to a DSP 74 acting as processing unit which separates the signals into the audio signals and the control data and which is provided for advanced processing, e.g. equalization, of the audio signals according to the information provided by the control data. The receiver unit 14 also includes a memory 76 for the DSP 74.

The processed audio signals, after digital-to-analog conversion, are supplied to a variable gain amplifier 62 which serves to amplify the audio signals by applying a gain controlled by the control data received via the digital link 12. The amplified audio signals are supplied to a power amplifier 78 which may be controlled by a manual volume control 80 and which supplies power amplified audio signals to a loudspeaker 82 which may be an ear-worn element integrated within or connected to the receiver unit 14.

Another alternative implementation of the receiver maybe a neck-worn device having a transmitter 84 for transmitting the received signals via with a magnetic induction link 86 (analog or digital) to the hearing aid 64 (as indicated by dotted lines in FIG. 6).

The receiver unit 14 may form a hearing device with a microphone arrangement 37 with microphones 37A, 37B for capturing audio signals from ambient sound which are processed in the DSP 74. In this case, the control data received from the transmission unit 10 may be used also for controlling the processing of the audio signals captured by the microphone arrangement 37.

Figure 7:
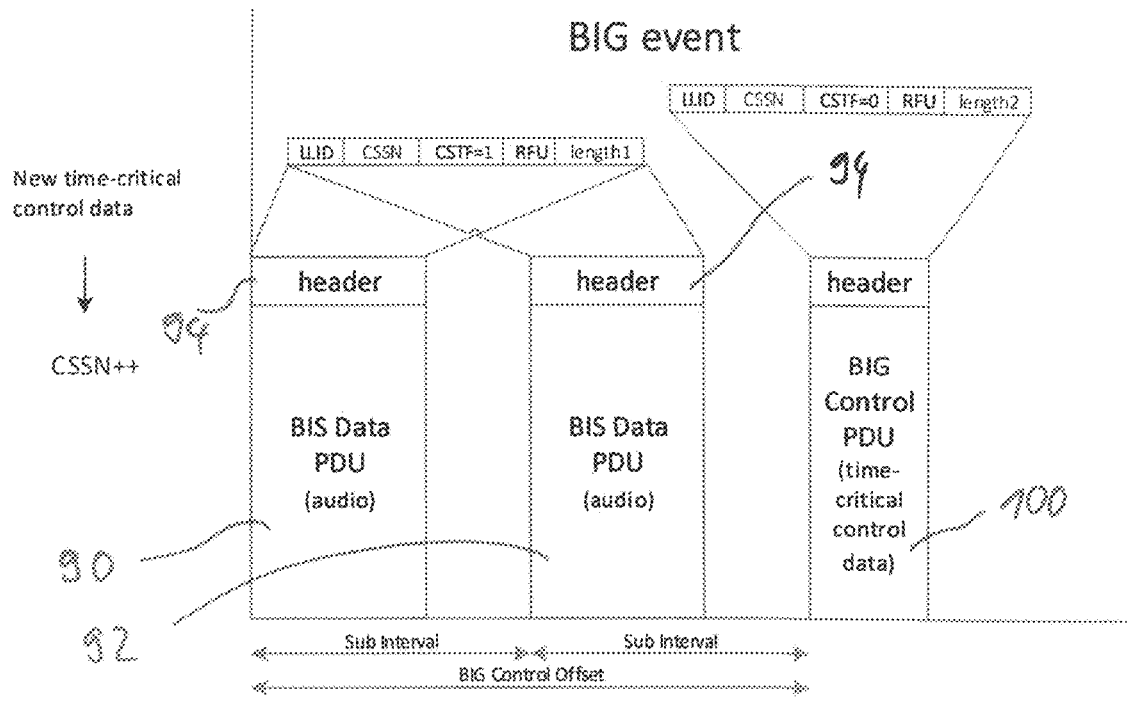
FIG. 7 schematically shows an example of a BIG event occurring during audio streaming using Bluetooth LE Audio.
Figure 8:
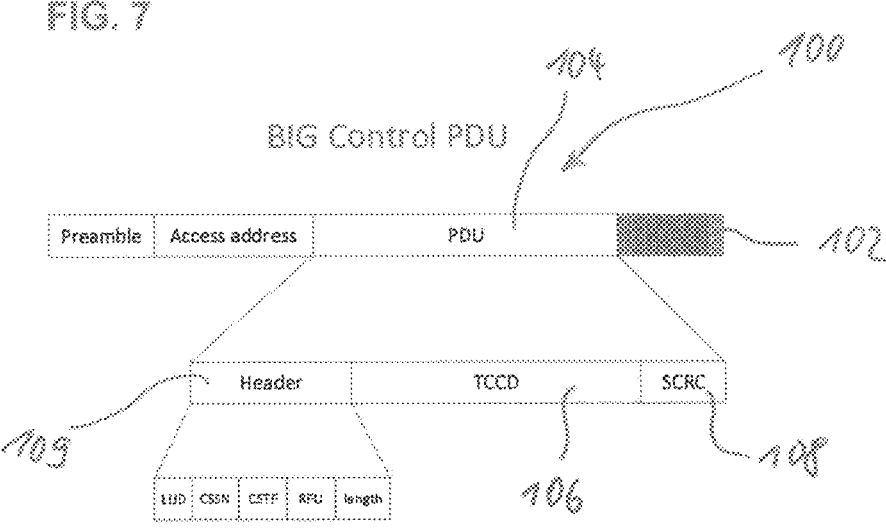
FIG. 8 schematically shows an example of modified BIG Control PDU which can be used for transmitting time-critical control data in an audio stream using Bluetooth LE Audio.

FIGS. 7 and 8 illustrate an example of how a Bluetooth LE Audio link can be used for transmitting both audio signals and time-critical control data with low latency from a transmission unit 10 to a receiver unit 14, while avoiding audio artefacts in the audio signal receiver unit 14.

The proposed solution exploits the BIG Control PDU that can optionally follow BIS Data PDUs (audio packets) transmitted in a Bluetooth LE Audio frame. According to the Bluetooth specification, these BIG Control PDUs are intended to carry Bluetooth Controller information (e.g., channel map updates or audio stream end notifications) and not to carry any application control data. However, modifying the BIG Control PDUs in a suitable manner allows to transmit time-critical control data via BIG Control PDUs. Such modification concerns primarily the CRC field, allowing to use the CRC field as a marker indicating the presence of time-critical control data in the payload of the BIG Control PDU. FIG. 7 schematically shows an example of a BIG event consisting of the transmission of a first audio data packet via a first BIS Data PDU 90 and of a second audio data packet via a second BIS Data PDU 92, followed by the transmission of a modified BIG Control PDU 100, an example of which is schematically shown in FIG. 8.

When the transmission unit identifies time-critical control data which has to be transmitted to the receiver unit(s), it may set in the headers 94 of the BIS Data PDUs 90, 92 the Control Subevent Transmission Flag (CSTF) to "1" and may increase the Control Subevent Sequence Number (CSSN) to indicate to the receiver unit(s) that it will transmit a new BIG Control PDU 100 after the BIS Data PDUs 90, 92 of the current BIG event. After receiving a BIS Data PDU 90, 92 during the BIG event, a receiver unit uses this header information to try to receive such BIG Control PDU 100 by listening in an appropriate manner.

In an alternative example, the dedicated receiver units may always check for a possible BIG Control PDU, even if CSTF is 0. Although this would result in an increase of the power consumption of the dedicated receiver units, it might be beneficial in situations where non-dedicated receiver units get confused by seeing CSTF=1 followed by a CRC error in the BIG Control PDUs.

The transmission unit transmits the BIG Control PDU 100 in the corresponding BIG subevent with the following characteristics: First, the CRC field 102 at the end of the packet 100 is provided in a special way (i.e., calculated by a "first algorithm") so that it is different from the standard CRC value that would be obtained according to the Bluetooth specification, thereby forming a "marked CRC value" different from the standard CRC value. For example, the standard CRC value may be "corrupted" by simply adding a constant value to the standard CRC value in order to obtain the marked CRC value, or some of the bits of the payload may be inverted when inputting the payload into the standard CRC calculation, thereby advertently obtaining a wrong value.

Second, the payload 104 contains a header 109, a Time-Critical Control Data (TCCD) field 106 with the desired time-critical information (e.g., VAD) and a software cyclic redundancy check (SCRC) field 108 based on the data in the TCCD field 106 (and the header) and computed in a specific way (i.e., by a "second algorithm") that is known to dedicated receiver units (i.e., receiver units supporting the specific method the transmission unit uses for modifying the BIG control PDU); for example, the algorithm calculating the value in the SCRC field 108 may be based on a mutually known CRC initialization vector.

Any receiver which receives such modified BIG control PDU 100 detects a CRC error when checking the value of the CRC field 102, and its Bluetooth Controller accordingly does not try to interpret the content of this PDU. This check is part of the Bluetooth protocol and usually is performed by the hardware of a receiver unit based on a given initialization value provided by the software (e.g., a "CRC_init"). After receiving the payload of the packet, the hardware computes the expected (i.e., standard) CRC based on the received payload and the CRC_init (and possibly other values as well) and compares the received value in the CRC field 102 with the one expected from the calculation given by the Bluetooth specification.

Non-dedicated receiver units (i.e., receiver units that do not support the method for modifying the BIG Control PDU) will simply discard the received PDU and will not process it further since they consider it corrupted as per the Bluetooth specification. This ensures that no side effect resulting from the modification of the BIG Control PDU occurs on such receiver units.

By contrast, dedicated receiver units, when detecting a CRC error (i.e., when finding a "wrong" value in the CRC field 102) will not generally discard the received BIG control PDU but will analyse the received BIG Control PDU as to whether or not the payload comprises time-critical control data. To this end, the receiver units may compute, using the same algorithm as the transmission unit, a software CRC value based on the received TCCD field 106 and compare it with the value in the SCRC field 108 included in the BIG Control PDU. If the two SCRC values are found to not match, the receiver unit will discard the BIG Control PDU and will not process it further since it is most likely a corrupted packet. If instead the two SCRC values are found to match, the receiver unit will interpret the content of the TCCD field 106 as time-critical control data information and will process it accordingly.

In order to improve robustness, transmission of the time-critical control data as modified BIG Control PDUs may be repeated in one or more of the subsequent BIG events. While at each repetition the latency increases, it will still be lower than when using standard Bluetooth mechanisms such as periodic advertising.

Such modification of the BIG Control PDUs is beneficial in that it avoids audio packet replacement (and therefore potential audio artefacts) and nevertheless ensures a low latency in the transmission of time-critical control data to dedicated receiver units, while standard Bluetooth receiver units will not suffer from negative side effects.

The customizations required to support such modification of the BIG Control PDUs will be in software only and will be feasible for any manufacturer that has the possibility to customize their stacks. Moreover, the required customizations are relatively simple.

A simple approach for transmitting control data from the transmission unit to standard (i.e., non-dedicated) Bluetooth LE Audio receiver units could be to include control data into periodic advertising packets that a Bluetooth LE Audio transmitter periodically transmits to all receivers. However, since typical periodic advertising intervals are in the order of 100 ms or more, the resulting latency would not be negligible for time-critical control data. Reducing the duration of periodic advertising intervals is generally possible, however, at the cost of increased energy consumption and more complex scheduling. Therefore, for transmission of time-critical control data, it is highly desirable to employ dedicated receiver units.

The time-critical control data transmitted by the transmission unit may be used by the audio signal receiving unit for controlling the processing of the audio signal received from the audio signal transmission unit.

For example, the time-critical control data may include information as to whether or not speech is absent in the audio signal transmitted by the transmission unit (which information may be provided by a VAD unit of the transmission unit). For example, a receiver unit implemented as a hearing device may activate noise cancellation on the received audio stream when the transmission unit indicates that speech is absent in the broadcasted audio stream (in this case the received audio stream only contains ambient noise) and may deactivate it when it is notified that speech is present again. Latency of VAD control data is crucial and should be in the order of few milliseconds, otherwise a hearing user may miss the initial syllables of a speech if the hearing device receives such control data too late. In this way the microphone audio signal input of the receiver unit has a higher gain (volume) than the broadcast audio signal when there is no speech in the broadcast audio signal; when speech is detected again, the gain of the broadcast audio signal is increased and broadcast audio signal and receiver unit microphone input are mixed together in a balanced way such that both can be heard by the user.

According to another example, the time-critical control data may include information regarding a surrounding noise level in the audio signal transmitted by the transmission unit (which information may be provided by a surrounding noise level detection unit of the transmission unit). For example, a receiver unit implemented as a hearing device may adapt the output level of the received audio signal (which is reproduced to the user of the hearing device) in order to optimize the signal-to-noise ratio depending on the amount of surrounding noise detected by the transmission unit. Thereby, the Surrounding Noise Compensation (SNC) can be improved. In this case the latency requirement is less critical than for control by VAD.

According to a further example, the time-critical control data may include information regarding current movement of the audio signal transmission unit in space, so that the processing of the received audio signals can be controlled based on the detected movement of the transmission unit. For example, based on accelerometer data reflecting movement of the transmission unit, the receiver unit can adjust (virtual) directionality in the rendering of the received audio stream accordingly.

According to an alternative embodiment, a modified-advertently "wrong"—calculation of the CRC is used to verify the payload of the BIG control PDU in a way that can be recognized by dedicated receiver units, rather than simply corrupting the correct standard CRC value, thus providing for a "customized CRC value" which allows to spare the need for the above software CRC field in the payload. In this case, the dedicated receiver unit first calculates—as in the examples described above—the standard CRC value for the received packet and compare it to value in the CRC field 102 of the received BIG Control PDU 100. While a non-dedicated (standard) receiver unit would simply discard the received PDU as being corrupted if the two CRC values do not match, a dedicated receiver unit would then perform a second CRC calculation, but now not using the Bluetooth specification but rather a proprietary algorithm that is also used by the transmission unit for generating the advertently wrong CRC value in the CRC field 102. If now this customized CRC value calculated by the receiver unit matches with the value in the CRC field 102, the receiver would interpret the payload 104 as valid time-critical control data and process it accordingly. If the CRC value calculated by the proprietary algorithm does not match with the value in the CRC field 102, the receiver unit would discard the BIG control PDU 100 as being corrupted.

It is to be noted that in this embodiment the standard Bluetooth CRC is actually replaced by a proprietary (or customized) CRC known both the transmission unit and the dedicated receiver units. In this case it is not sufficient to simply "corrupt" the CRC field 102; rather the proprietary algorithm to compute the proprietary CRC should be selected such that for a given payload (which could be very short) it always generates a CRC different from the "standard" one. The proprietary CRC algorithm—like the standard CRC algorithm—may be implemented by hardware (i.e., by a specific additional hardware).

In Bluetooth LE the 24-bit standard CRC is computed based on all bits of a packet using a polynomial with the form of $x^{24}+x^{10}+x^9+x^6+x^4+x^3+x+1$. In a typical implementation based on a linear feedback shift register (LFSR) the register is initially filled with a predefined CRCinit value, then every bit of the packet is fed into the circuit: the standard CRC value corresponds to the value in the register after the last bit of the packet has been inserted.

For a BIG Control PDU, the CRCinit value consists of 8 zeros (BIS_Number) followed by a 16-bit BaseCRCInit value that the transmitter randomly generates and provides to the receivers.

There are several options of how to generate a "customized" CRC value:

According to a first example, one may use a different CRCinit value that both compatible transmitters and receivers know, either a hardcoded value or a value that can be derived based on the nominal one.

According to a second example one may use a different polynomial than the standard one, either with the same CRCinit value or a different one.

According to a third example one may use the same CRCinit value but manipulate the computed standard CRC value in a way that is known to compatible transmitters and receivers (e.g., by flipping several bits of the standard CRC value).

What is claimed is:

1. A method for transmitting audio signals, comprising:
establishing a wireless link utilizing Bluetooth LE Audio between an audio signal transmission unit and an audio signal receiver unit;
transmitting BIS data PDUs representative of an audio signal via the wireless link from the audio signal transmission unit to the audio signal receiver unit;
providing, by the audio signal transmission unit, a BIG control PDU with time-critical control data to be transmitted to the audio signal receiver unit as part of its payload, wherein a marked CRC value is provided in a standard CRC field of said BIG control PDU which is different from the standard CRC value of said BIG control PDU;
transmitting, by the audio signal transmission unit, the BIG control PDU via the wireless link to the audio signal receiver unit, and receiving, by the receiver unit, the BIG control PDU;
calculating, by the audio signal receiver unit, the standard CRC value of the received BIG control PDU and comparing the calculated standard CRC value with the value of the standard CRC field of the received BIG control PDU; and
analyzing, by the audio signal receiver unit, the received BIG control PDU as to whether or not the payload comprises time-critical control data, when the value of the standard CRC field of the received BIG control PDU does not match the calculated standard CRC value of the received BIG control PDU.

2. The method of claim 1, wherein the marked CRC value is provided by a first algorithm which calculates the standard CRC value and advertently corrupts the calculated standard CRC value, such as by adding a constant value to the standard CRC value or by inverting at least one bit of the payload when calculating the standard CRC value.

3. The method of claim 1, wherein the payload of the BIG control PDU includes a time-critical control data (TCCD) field for the time-critical control data and a software CRC (SCRC) field containing a SCRC value calculated by a second algorithm based on the time-critical control data in the TCCD field; and wherein the audio signal receiver unit, when the CRC value of the standard CRC field of the BIG control PDU was found to not match with the standard CRC value, calculates, using the second algorithm, the SCRC value of the data in the TCCD field of the BIG control PDU received from the audio signal transmission unit and compares the calculated SCRC value with the value of the SCRC field of the received BIG control PDU so as to verify the data in the TCCD field as valid control data for the audio signal receiver unit.

4. The method of claim 1, wherein the marked CRC value is calculated as a customized CRC value by a first algorithm from the payload of the BIG Control PDU, wherein the audio signal receiver unit, when the value of the standard CRC field of the received BIG control PDU was found to not match the standard CRC value, calculates, using the first algorithm, the customized CRC value of the received BIG control PDU, and wherein the time-critical control data in the received BIG control PDU is verified as valid control data for the audio signal receiver unit when the customized CRC value is found to match with the value in the standard CRC field of the received BIG control PDU.

5. A method for transmitting audio signals, comprising:
establishing a wireless link utilizing Bluetooth LE Audio between an audio signal transmission unit and an audio signal receiver unit;
transmitting BIS data PDUs representative of an audio signal via the wireless link from the audio signal transmission unit to the audio signal receiver unit;
providing, by the audio signal transmission unit, a BIG control PDU with time-critical control data to be transmitted to the audio signal receiver unit as part of its payload, wherein a marked CRC value is provided in a standard CRC field of said BIG control PDU which is different from the standard CRC value of said BIG control PDU and wherein the marked CRC value is calculated as a customized CRC value by a first algorithm from the payload of the BIG Control PDU;
transmitting, by the audio signal transmission unit, the BIG control PDU via the wireless link to the audio signal receiver unit, and receiving, by the receiver unit, the BIG control PDU;
analyzing, by the audio signal receiver unit, the received BIG Control PDU as to whether or not the payload comprises time-critical control data, wherein the audio signal receiver unit calculates, using the first algorithm, the customized CRC value of the received BIG control PDU, and wherein the time-critical control data in the received BIG control PDU is verified as valid control data for the audio signal receiver unit when the customized CRC value is found to match with the value in the standard CRC field of the received BIG control PDU; and
when the customized CRC value is found to not match with the value in the standard CRC field of the received BIG control PDU, calculating, by the audio signal receiver unit, the standard CRC value of the received BIG control PDU and comparing the calculated standard CRC value with the value of the standard CRC field of the received BIG control PDU, wherein the audio signal receiver unit considers the BIG control PDU to contain Bluetooth LE Audio control data when the calculated standard CRC value matches with the value of the standard CRC field of the received BIG control PDU.

6. The method of claim 5, wherein a Bluetooth LE Audio controller of the audio signal receiver unit ignores the BIG control PDU as not containing Bluetooth LE Audio control data when the Bluetooth LE Audio controller finds a mismatch of the value of the standard CRC field of the received BIG control PDU with the standard CRC value.

7. The method of claim 5, wherein the transmitting of time-critical control data by the audio signal transmission unit as part of the BIG control PDU follows the transmission of the BIS data PDUs in a current BIG event.

8. The method of claim 5, wherein the time-critical control data is used by the audio signal receiving unit for controlling processing of the audio signal received from the audio signal transmission unit.

9. The method of claim 8, wherein the time-critical control data includes at least one of: information as to whether or not speech is absent in the audio signal to be transmitted, information regarding a surrounding noise level in the audio signal to be transmitted, and information regarding current movement of the audio signal transmission unit in space.

10. The method of claim 5, wherein the audio signal transmission unit is designed as a wireless microphone arrangement to be worn or held by a speaker for capturing the speaker's voice as the audio signal to be transmitted, and wherein the audio signal receiver unit is a hearing device for stimulating the hearing of a user according to the audio signal received from the audio signal transmission unit.

11. The method of claim 5, wherein the audio signal transmission unit broadcasts the audio signal via the wireless link to a plurality of audio signal receiver units, including said audio signal receiver unit.

12. The method of claim 11, wherein the plurality of audio signal receiving units includes at least one audio signal receiver unit which is programmed to generally ignore the BIG control PDU when its Bluetooth LE Audio controller finds a mismatch of the CRC value in the standard CRC field of the BIG control PDU with the standard CRC value.

13. The method of claim 5, wherein the audio signal transmission unit transmits time-critical control data not only as part of the payload of the BIG control PDU but in addition also as part of periodic advertising packets which the audio signal transmission unit periodically transmits via the wireless link.

14. A system for transmitting audio signals, comprising an audio signal transmission unit and an audio signal receiver unit, both of which include a wireless interface for establishing a wireless link utilizing Bluetooth LE Audio between the audio signal transmission unit and the audio signal receiver unit;
the audio signal transmission unit being configured to
transmit BIS data PDUs representative of an audio signal via the wireless link from the audio signal transmission unit to the audio signal receiver unit;
provide a BIG control PDU with time-critical control data to be transmitted to the audio signal receiver unit as part of its payload, wherein a marked CRC value is provided in a standard CRC field of said BIG control PDU which is different from the standard CRC value of said BIG control PDU;
transmit the BIG control PDU via the wireless link to the audio signal receiver unit; the audio signal receiver unit being configured to
calculate the standard CRC value of the BIG control PDU received from the audio signal transmission unit;
compare the standard CRC value with the value of the standard CRC field of the received BIG control PDU; and
analyze the received BIG control PDU as to whether or not the payload comprises time-critical control data, when the value of the standard CRC field of the received BIG control PDU does not match the calculated standard CRC value of the received BIG control PDU.

15. A system for transmitting audio signals, comprising an audio signal transmission unit and an audio signal receiver unit, both of which include a wireless interface for establishing a wireless link utilizing Bluetooth LE Audio between the audio signal transmission unit and the audio signal receiver unit;

the audio signal transmission unit being configured to transmit BIS data PDUs representative of an audio signal via the wireless link from the audio signal transmission unit to the audio signal receiver unit;

provide a BIG control PDU with time-critical control data to be transmitted to the audio signal receiver unit as part of its payload, wherein a marked CRC value is provided in the standard CRC field of said BIG control PDU which is different from the standard CRC value of said BIG control PDU, and wherein the marked CRC value is calculated as a customized CRC value by a first algorithm from the payload of the BIG Control PDU; and transmit the BIG control PDU via the wireless link to the audio signal receiver unit;

the audio signal receiver unit being configured to analyze the received BIG Control PDU as to whether or not the payload comprises time-critical control data by calculating, using the first algorithm, the customized CRC value of the received BIG control PDU, wherein:

when the customized CRC value is found to match with the value in a standard CRC field of the received BIG control PDU the time-critical control data in the received BIG control PDU is verified as valid control data for the audio signal receiver unit; and when the customized CRC value is found to not match with the value in the standard CRC field of the received BIG control PDU, the standard CRC value of the received BIG control PDU is calculated and is compared with the value of the standard CRC field of the received BIG control PDU, wherein the BIG control PDU is considered to contain Bluetooth LE Audio control data when the calculated standard CRC value matches with the value of the standard CRC field of the received BIG control PDU.

\* \* \* \* \*